United States Patent [19]

Pasch et al.

[11] 4,140,470

[45] Feb. 20, 1979

[54] TRANSFER MOLDING VENTING SYSTEM

[75] Inventors: Lambert Pasch, Aachen-Nutheim; Heinz Wagemann, Aachen, both of Fed. Rep. of Germany

[73] Assignee: Uniroyal Aktiengesellschaft, Aachen, Fed. Rep. of Germany

[21] Appl. No.: 783,593

[22] Filed: Apr. 1, 1977

[30] Foreign Application Priority Data

Apr. 8, 1976 [DE] Fed. Rep. of Germany ....... 2615177

[51] Int. Cl.² .......................... B29F 1/00; B29H 3/10
[52] U.S. Cl. ................. 425/544; 425/405 R; 425/420; 425/546; 425/812
[58] Field of Search ............ 425/812, 420, 584, 544, 425/546, 405 R; 249/141; 264/101, 102

[56] References Cited

U.S. PATENT DOCUMENTS

| 1,190,072 | 7/1916 | Aiken | 425/405 X |
|---|---|---|---|
| 2,452,382 | 10/1948 | Long | 425/405 X |
| 2,586,148 | 2/1952 | Clark et al. | 425/420 X |
| 2,976,571 | 3/1961 | Moslo | 249/141 |
| 3,341,647 | 9/1967 | Aberle | 425/812 |
| 3,372,436 | 3/1968 | Davis | 425/420 X |
| 3,859,024 | 1/1975 | Pasch et al. | 425/547 |

FOREIGN PATENT DOCUMENTS

| 2022686 | 12/1971 | Fed. Rep. of Germany | 425/544 |
|---|---|---|---|
| 2352878 | 4/1975 | Fed. Rep. of Germany | 425/812 |
| 1383093 | 11/1963 | France | 425/544 |
| 1052889 | 12/1966 | United Kingdom | 425/546 |
| 1462622 | 1/1977 | United Kingdom | 425/812 |

*Primary Examiner*—William R. Briggs
*Attorney, Agent, or Firm*—Marcus J. Millet

[57] ABSTRACT

Apparatus for molding elastomeric articles is disclosed, the apparatus including an injection unit having an open-ended chamber in which elastomeric stock is disposable and from which such stock can be expelled, a multi-cavity mold having cavities aligned with corresponding ones of the apertures of the end plate, a device for moving the injection unit and mold relative to one another to engage the mold with the end plate, and a pneumatic venting system for evacuating fluid entrapped in each of the mold cavities preparatory to filling the latter with elastomeric stock from the injection unit. The foregoing abstract is neither intended to define the invention disclosed in the specification, nor is it intended to limit the scope of the invention in any way.

22 Claims, 12 Drawing Figures

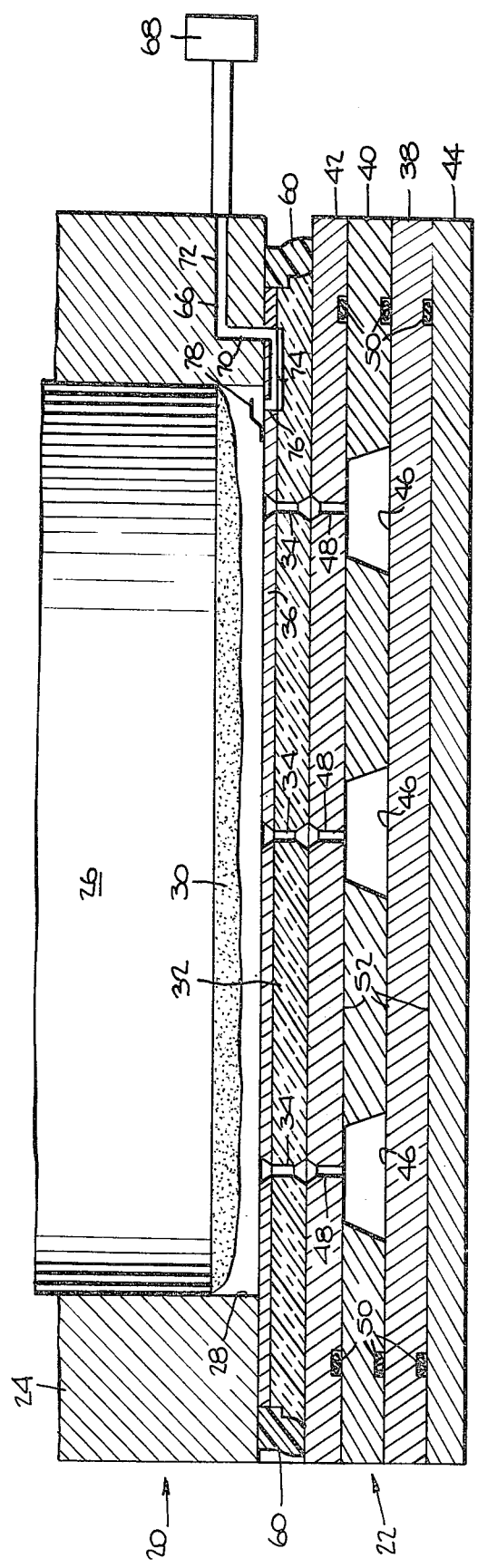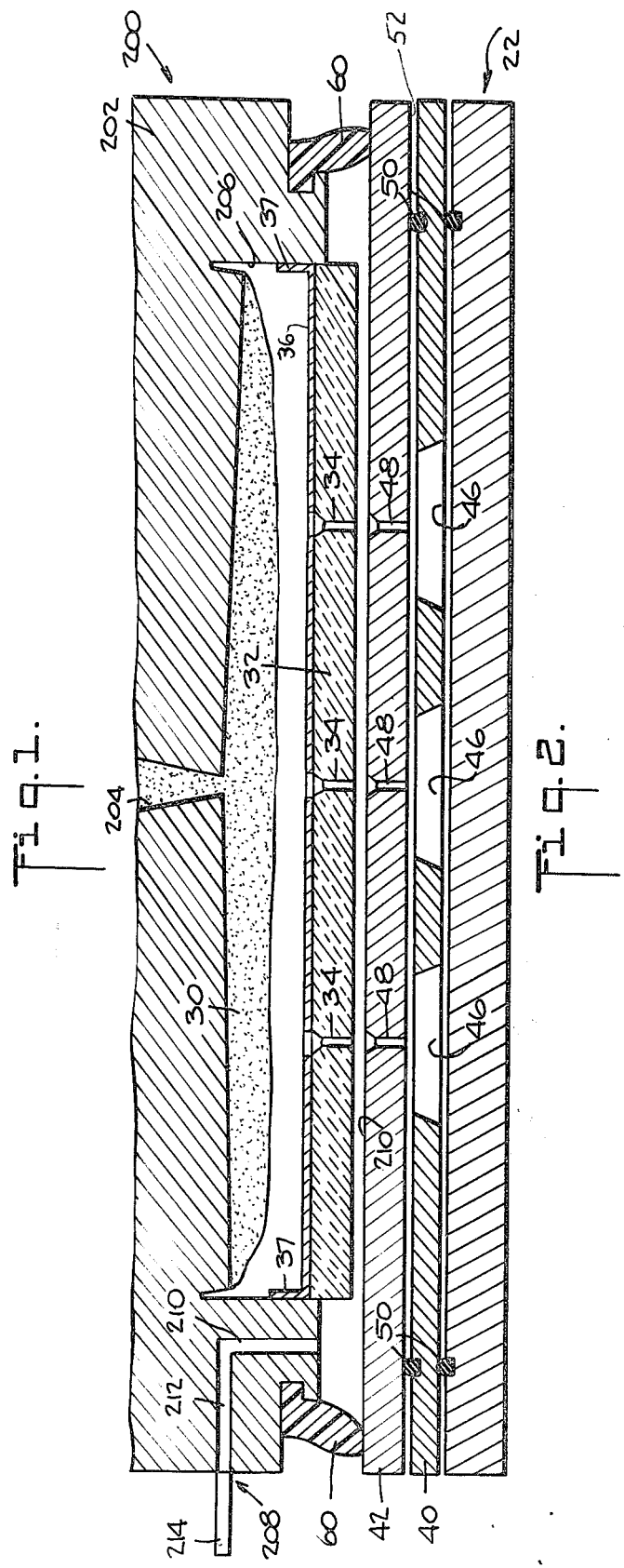

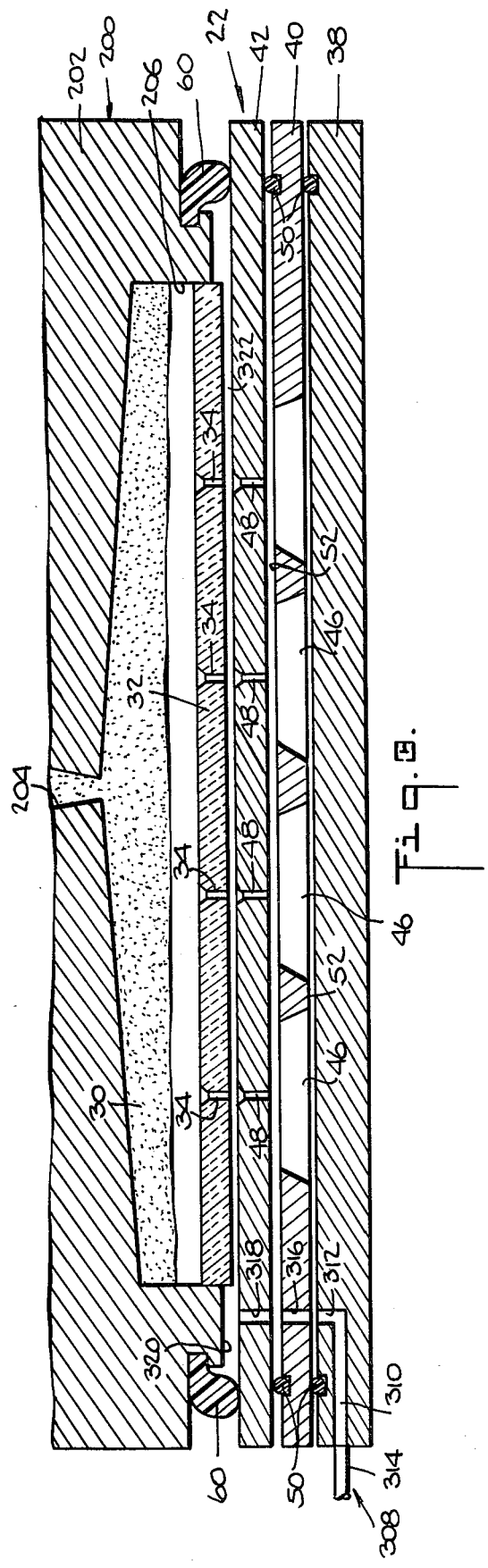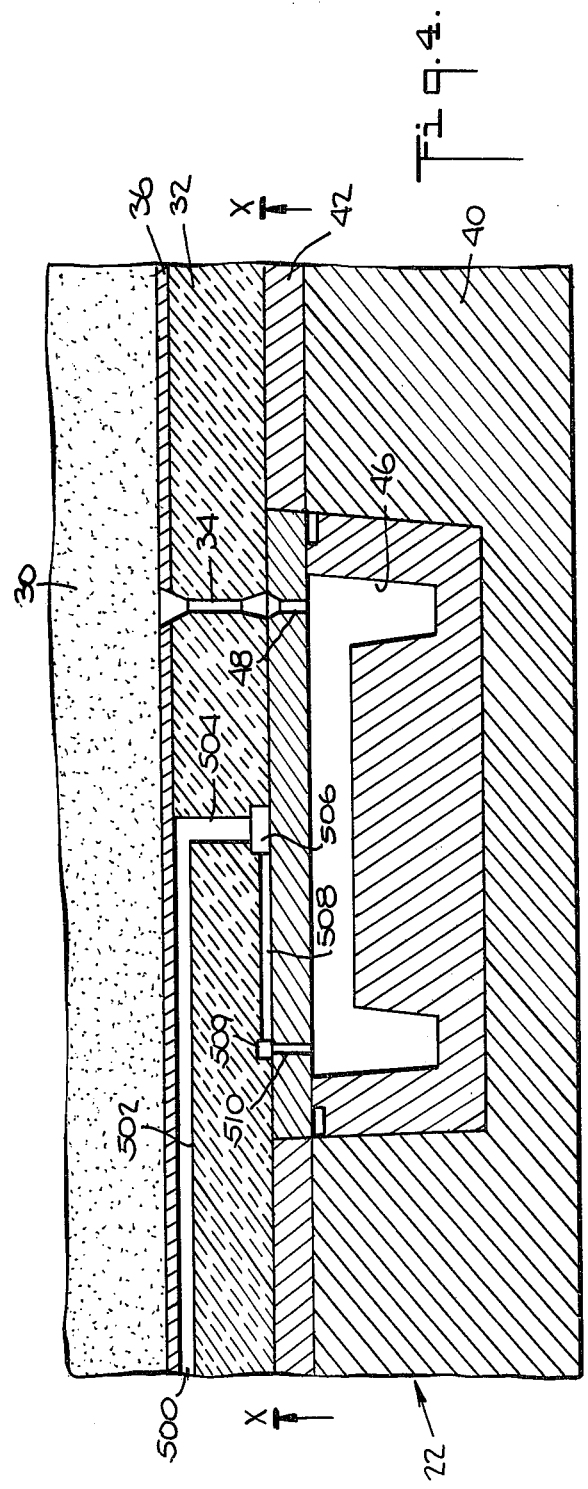
Fig. 3.
Fig. 4.

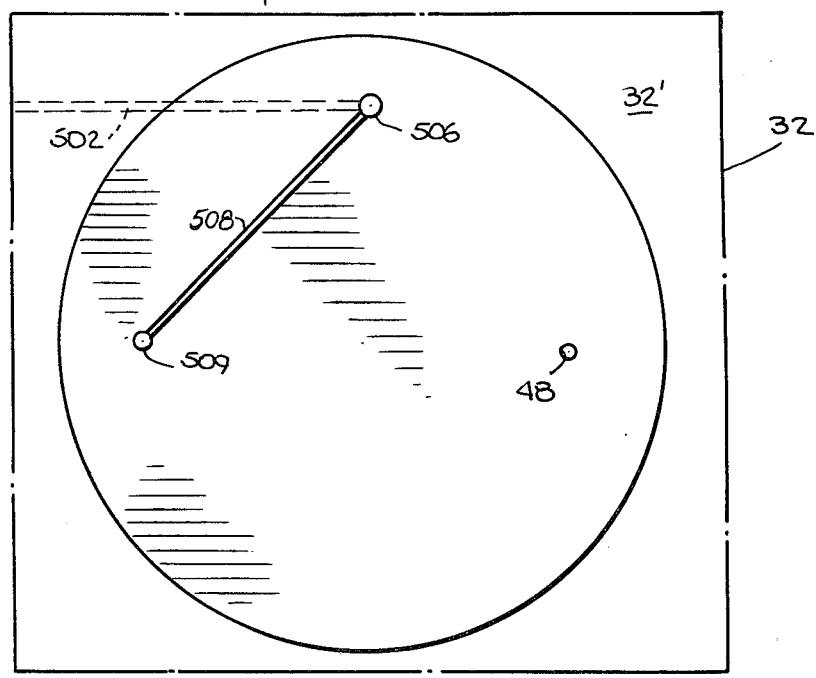
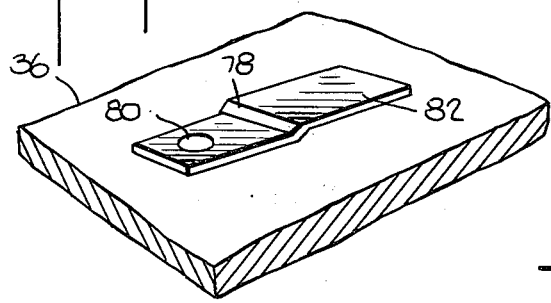
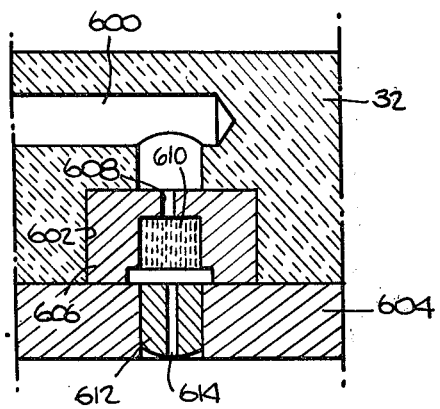
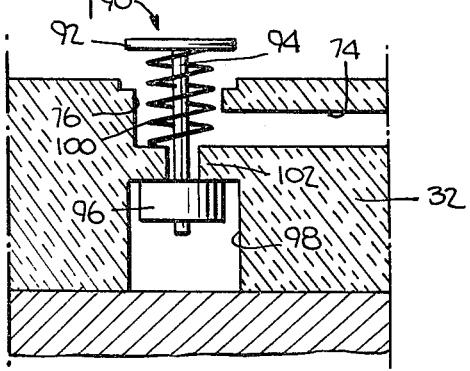
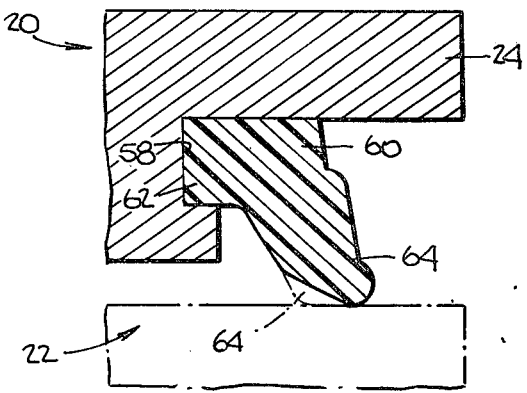

TRANSFER MOLDING VENTING SYSTEM

BACKGROUND OF THE INVENTION

The present invention relates generally to the field of molding elastomeric articles with apparatus incorporating, for example, an injection unit and a mold, and more particularly to a venting system for evacuating fluid such as air or the like entrapped in the mold cavities preparatory to filling the latter with elastomeric stock from the injection unit.

Generally speaking, apparatus for molding elastomeric articles constituted of, for example, elastomers in the form or rubber mixtures that can be vulcanized when subjected to heat, or synthetic plastics that can be cross-linked and hardened, may be comprised of transfer molding equipment including an injection unit and a mold movable relative to one another. The mold may be comprised of a large number of cavities, whereas, the injection unit may be comprised of a cylinder having an open-ended portion from which elastomeric stock can be expelled into the various mold cavities when the mold and the injection cylinder are engaged with one another.

The injection cylinder may be provided with a multi-apertured end plate that is either fixedly secured to the open-ended portion thereof, or is frictionally retained or otherwise constrained in the open-ended portion thereof for movement axially relative thereto at least partially into the cylinder chamber. Such apparatus is generally disclosed in U.S. Pat. No. 3,859,024, issued on Jan. 7, 1975, the subject matter of which is fully incorporated by reference herein.

Briefly, in operation of a multi-cavity mold and an injection cylinder to which is fixedly secured a multi-apertured end plate, the mold and injection cylinder are moved relative to one another to effect engagement of the mold with the end plate such that the apertures of the end plate are coaxially aligned with corresponding ones of the mold cavities. Thereafter, a piston movably confined in the injection cylinder is operated to compact or compress the elastomeric stock in the injection cylinder and cause the expulsion of such stock through the apertures in the end plate and into the mold cavities.

Such operation of an injection unit to which it is fixedly secured a multi-apertured end plate is to be distinguished from the operation of an injection cylinder to which is movably secured a multi-apertured end plate. In the latter regard, the piston in the injection cylinder can be protracted slightly to force a portion of elastomeric stock axially outwardly of the injection chamber and, thereby, force at least partially outwardly therefrom the multi-apertured end plate. With the apertured end plate so outwardly disposed, and with the piston held stationary, the mold and injection unit can be moved relative to one another to effect engagement of the mold with the end plate and, thereby, force the end plate inwardly of the open-end of the injection cylinder. Such action will reduce the axial extent of the injection chamber, and will, thereby, in turn, cause the expulsion of elastomeric stock through the apertures in the end plate and into corresponding ones of the mold cavities.

It has been determined that in order to effectively produce elastomeric molded articles that are "flashless," i.e., from which there are absent burrs or other undesirable vulcanized apendages, it is important, among other things, to evacuate all undesirable fluids, such as air, entrapped in the mold cavities, as well as in the injection chamber communicating with the mold cavities via the apertures in the end plate, preparatory to filling such cavities with the elastomeric stock. The present invention is particularly concerned with the provision of means for eliminating the cause of molding imperfect articles as a result of the presence of air or other fluid entrapped in the mold cavities and the injection chamber.

A number of conventional systems have been suggested for evacuating fluid or air entrapped in the mold cavities, such as, for example, the systems disclosed in British Pat. No. 1,403,165, published on Aug. 13, 1975, and German Application No. 2,022,686, published on Dec. 2, 1971. One disadvantage associated with each of the British and German published disclosures is that in each instance the mold cavities are directly associated with a venting hose or tube and a vacuum pump for evacuating fluid entrapped in the mold cavities. As a result, because of the direct connection of the pump with the mold cavities, the pump creates a suction on the elastomeric stock in the mold cavities tending to pull at least a portion of the elastomeric stock from the mold cavities and into the vacuumed passageways, thus resulting in the formation of a suction wate plug. Not only is the formation of such waste costly, but it is also difficult to remove from the tubes or other passageways that they clog.

SUMMARY OF THE INVENTION

Accordingly, it is a principal object of the present invention to provide a system for evacuating fluid entrapped in mold cavities of a transfer molding assembly preparatory to filling the mold cavities with elastomeric stock.

It is another object of the present invention to provide a fluid-evacuation system that not merely communicates with the mold cavities, but simultaneously communicates also with the interior of an injection cylinder from which elastomeric stock can be expelled into the various cavities.

It is a further object of the present invention to provide a system for injecting a gas such as carbon dioxide or the like into the various mold cavities and the injection chamber of a transfer molding assembly which is readily absorbed by the elastomeric stock together with the remainder of the fluids entrapped in such cavities and chamber, thus, obviating the need to evacuate such entrapped fluids.

It is still a further object of the present invention to provide a system capable of evacuating fluid from the various mold cavities before and/or during the period in which such mold cavities are filled with elastomeric stock.

It is still a further object of the present invention to provide a system for evacuating air from the mold cavities, from the injection chamber, and, in the case where the mold cavities are defined by at least two separable, superposed plates, from the parting line clearance therebetween.

Accordingly, the present invention may be characterized as venting means for molding apparatus, particularly of the transfer molding variety, the apparatus including an injection unit having an open-ended chamber in which elastomeric stock is disposable and from which such stock can be expelled, a multi-apertured, end plate, preferably one that is thermal-insulatory and flexible, secured to the open end of the chamber, a multi-cavity mold having cavities aligned with corresponding ones of the apertures of the end plate, means for moving the injection unit and mold relative to one another to engage the mold with the end plate, and the aforementioned venting means that is capable of simultaneously evacuating fluid entrapped in the chamber of the injection unit and in the mold cavities (with closed parting lines) preparatory to and during filling the mold cavities with elastomeric stock from the injection chamber.

BRIEF DESCRIPTION OF THE DRAWINGS

While the specification concludes with claims which particularly point out and distinctly claim the subject matter regarded as the invention herein, it is believed that the invention will be better understood from the following description thereof taken in conjunction with the accompanying drawings, in which:

FIG. 1 is a fragmentary, vertical, cross-sectional view of one type of transfer molding apparatus employing one embodiment of the venting means of the present invention and having an end plate that is fixedly secured to the injection cylinder;

FIG. 2 is a view similar to FIG. 1 of a second type of transfer molding apparatus in which the end plate is movable axially relative to the injection cylinder, and in which there is employed a second embodiment of the venting means of the present invention;

FIG. 3 is a view similar to FIG. 2, but illustrating a varient of the embodiment of the venting means of FIG. 2;

FIG. 4 is an enlarged, fragmentary, vertical, cross-sectional view of transfer molding apparatus pursuant to the present invention in which there is illustrated still a further embodiment of the venting means of the present invention;

FIG. 5 is a fragmentary, enlarged view of the underside of the end plate illustrated in FIG. 4 as viewed in the direction of arrows x at the parting line between the end plate and the mold;

FIG. 6 is an enlarged, fragmentary, perspective view of an embodiment of a closing means for the venting means of the embodiment of FIG. 1;

FIG. 7 is a fragmentary, vertical, cross-sectional view of still another embodiment of the closing means for the venting means of the embodiment of FIG. 1;

FIG. 8 is a fragmentary, vertical, cross-sectional view of still another embodiment of the closing means for the venting means of any of the embodiments of the present invention;

FIG. 9 is an enlarged, fragmentary, vertical, cross-sectional view of the sealing means for the venting means of the present invention;

DETAILED DESCRIPTION OF THE INVENTION

Figure 12:
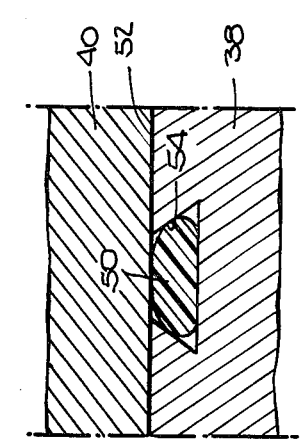
FIG. 12 is a view similar to FIG. 11, but illustrating the gasket means of FIG. 11 in a compressed condition resulting from the pressure of the opposing superposed mold plates against one another.

Referring now to the drawings, and more particularly to FIG. 1 thereof, the present invention relates generally to transfer molding apparatus in the form, for example, of an injection unit 20 and a mold 22. The injection unit 20 is in the form, for example, of the type disclosed in the aforementioned U.S. Pat. No. 3,859,024, the subject matter of which is hereby incorporated by reference herein. For example, the injection unit 20 may have a bottomless injection cylinder 24 in a chamber 28 of which is confined an axially or endwise movable piston 26. Elastomeric stock 30 can be disposed into, and expelled by the piston 26 from, the chamber 28. Affixed to the open end of the cylinder 24 is, for example, a multi-apertured end plate 32 fabricated from a thermal-insulatory material. The end plate 32 may be provided with a plurality of apertures 34, and may have superposed thereupon, and affixed thereto, in confronting relation with the elastomeric stock 30, a metallic, flexible plate 36 formed with corresponding apertures coaxially aligned with respective ones of the apertures 34 in the thermal-insulatory end plate 32.

The mold 22 is, for example, provided with a base plate 38, a cavity-defining plate 40 superposed upon the base plate 38, and a cover or sprue plate 42 superposed upon the cavity-defining plate 40. The plates 38, 40 and 42, for example, may be superposed upon a support means 44 associated with, for example, appropriate means for axially moving the mold 22 toward and away from the injection unit 20. Of course, alternatively, the injection unit 20 may be associated with means (not shown) for moving the injection cylinder 24 toward and away from the mold 22. In that instance, the support means 44 would be stationary. As illustrated in FIG. 1, the cavity-defining plate 40 is provided with a plurality of enlarged chambers defining respective cavities 46 that are aligned with corresponding apertures or sprues 48 formed in the sprue plate 42. In turn, the sprues 48 are coaxially aligned with corresponding ones of the apertures 34 formed in the end plate 32 of the injection unit 20.

Figure 11:
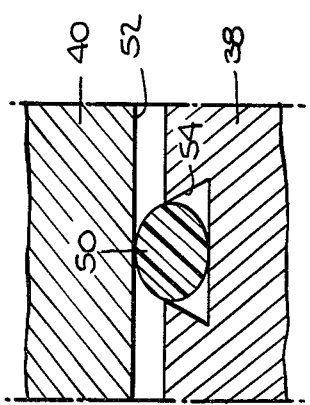
FIG. 11 is an enlarged, fragmentary, vertical, cross-sectional view of substantially underformed gasket means for providing for a clearance between the superposed mold plates of the apparatus of the present invention.

Preferably, there are provided three elastomeric gaskets 50 disposed, respectively, between the plates 44, 38, 40 and 42 of the mold 22. The nature of the elastomeric gaskets is best illustrated in FIGS. 11 and 12. Each gasket 50 when not pressured by opposing ones of the mold plates, for example, the plates 38 and 40 (FIG. 11), presents a somewhat oval or circular cross-section that is dimensionally sufficient to space the plates 38 and 40 from one another at their mutually-defining parting line 52. However, on the other hand, when the plates 38 and 40 are pressed against one another, such as, for example, occurs when the injection unit 20 and the mold 22 are axially pressed against one another preparatory to injecting the mold cavities 46 with elastomeric stock from the injection cylinder 24, the gasket 50 is sufficiently compressible so as not to interfere with movement of the plates 38 and 40 (or 40 and 42, etc.) into axially engaging relation with one another so as to seal their mutually-defining parting line 52 therebetween (FIG. 12). It is preferred, that at least one plate of each pair of plates associated with a respective one of the gaskets 50 be provided with an annular conduit 54 that is generally triangular-like in cross-section and of a sufficient size to accommodate a corresponding one of the gaskets 50 when the latter is compressed as illustrated in FIG. 12.

As further illustrated in FIG. 1, as well as in FIG. 9, the injection cylinder 24, at the open end thereof, is provided with an annular groove 58 in which is confined an elastomeric, annular, sealing element 60 having an appropriate annular shoulder 62 constrained in the annular groove 58 of the injection cylinder 24. The sealing element 60 is further provided with a skirt-like portion 64 that is both axially compressible and radially deformable outwardly from a first position illustrated in broken line to a second position illustrated in solid line when the injection unit 20 and mold 22 are initially caused to engage one another.

Still referring to FIG. 1, the injection unit 20 is provided with venting means 66 for evacuating undesirable fluid such as air from the mold cavities 46 preparatory to filling the latter with elastomeric stock from the injection chamber 28. In this respect, the venting means 66 is provided in the form of a plurality of intercommunicating conduits, or conduit portions, which at one end communicate with a vacuum-inducing means such as a pump 68 and at the other end with (a) the interior of the injection chamber 28, (b) each of the apertures 34 formed in the end plate 32, (c) each of the sprues 48 formed in the sprue plate 42, and (d) each of the cavities 46 of the mold 22.

Particularly, the venting means 66 includes a first pair of mutually perpendicular conduit portions 70 and 72 formed in the open-end of the injection cylinder 24, and a laterally running conduit portion 74 formed in the end plate 32 between, for example, the thermal-insulatory plate portion and the metal plate 36. The venting means 66 further includes an axially running conduit or passageway 76 running upwardly to and communicating directly with the interior of the injection chamber 28.

Overlying the passageway 76, is a flexible cover member 78. The member 78 as best illustrated in FIG. 6 is provided with a first portion that is affixed to the metal plate 36 such as, for example, by a pin 80 or the like, and with a second portion 82 that is cantilevered in spaced relation above the passageway 76. The element 78 is capable of flexing downwardly to completely cover and seal the passageway 76 when pressured by elastomeric stock from above within the injection chamber 24. However, the element 78 has an at-rest position adapted to remain slightly above the passageway 76 when the latter is utilized for evacuating air from the mold cavities 46 and the injection chamber 28 by the vacuum-inducing means 68.

It will be understood that the vacuum-inducing means 68 may, as contemplated by the present invention, be in the form of a pump for injecting a fluid such as carbon dioxide or the like into the intercommunicating cavities 46 and injection chamber 28 to assist the elastomeric stock to absorb the entrapped fluid, such as air, in such cavities and injection chamber and obviate the need to evacuate such entrapped fluid therefrom. In this regard, carbon dioxide is inherently capable of being absorbed by rubber-constituted, elastomeric stock.

In operation of the embodiment illustrated in FIG. 1, the injection unit 20 and mold 22 can be moved into proximity with one another such that the upper surface of the cover or sprue plate 42 of the mold 22 engages the sealing element 60 so as to deform the latter slightly into a condition as generally illustrated in FIG. 9. Once the sealing element 60 has been so deformed, the injection cylinder 24 and the mold 22 can be said to be effectively pneumatically sealed to one another. The vacuum-inducing means 66 can then be activated to establish at least a partial vacuum in the mold cavities 46 and the injection chamber 28 to initiate the evacuation of fluid from such cavities and injection chamber.

During the period in which fluid is evacuated from the cavities and the injection chamber, the cantilevered portion 82 (FIG. 6) of the element 78 remains spaced from the passageway 76 of the conduit system 66 to enable such fluid to be so evacuated. However, during the end of the period in which such pneumatic evacuation takes place, the piston 26 of the injection unit 20 can be protracted to compact the elastomeric stock 30 against the multi-apertured end plate 32 and force at least a portion of such stock through the apertures 34 and into the sprues 48 and cavities 46. As the stock 30 is initially compacted, it is forced against the element 78 overlying the venting passageway 76, thereby, in turn, forcing the element 78 against the passageway 76. When the element 78 engages the portion of the end plate 32 surrounding the passageway 76, such element 78 closes the passageway 76 and prevents the elastomeric stock 30 from penetrating the passageway 76.

It will be understood that at least initially when the partial vacuum is established in the cavities 46 and the injection chamber 28 the mold 22 need not be pressed tightly against the end plate 32 of the injection unit 20. On the contrary, all that need be established is a sufficient contact of the sprue plate 42 with the sealing element 60 to enable the latter to seal off the interior of the injection chamber 28 and cavities 46 from the atmosphere. Of course, once the injection cycle is initiated, the mold 22 and end plate 32 must engage one another tightly causing the gaskets 50 (FIGS. 11 and 12) to deform and the mold plates 38, 40 and 42 to tightly engage one another also.

As an alternate embodiment of the element 78 associated with the venting passageway 76, there is contemplated, as illustrated in FIG. 7, the use of a valve means 90 for sealing the venting passageway 76 from elastomeric stock. In this regard, the valve means 90 may be confined at least in part in the passageway 76 of the end plate 32. The valve means 90 may be provided with a head 92 of circular configuration affixed to a stem 94 that is axially movable in the passageway 76. At the opposite end of the stem 94, there may be provided, for example, a nut 96 that is axially movable together with its associated end portion of the stem 94 in a recess 98 also formed in the end plate 32.

Interposed between the nut 96 and the head 92 of the valve means 90 is, for example, a helical spring 100 that presses at one end against a constriction 102 formed at the upper portion of the recess 98 or at the lower portion of the venting passageway 76, and at its opposite end against the head 92. As a result, the spring 100 tends to urge the head 92 of the valve means 90 upwardly so as to allow the passageways 74 and 76 to communicate with the interior of the injection chamber 28, the nut 96 acting as an abutment to limit the amount of upward movement of the head 92. On the other hand, when elastomeric stock in the injection chamber 28 is forced downwardly against the head 92 of the valve means 90, such head 92 is caused to engage the upper portion of the venting passageway 76 and seal the latter against the penetration therethrough of elastomeric stock.

Referring now to FIG. 2, there is illustrated a transfer molding injection unit denoted generally by the reference character 200. The injection unit 200 is illustrated in operative association with the aforementioned mold 22. It will be understood that the elements of the mold 22, etc., illustrated in FIG. 2, as well as in the other Figures, with reference characters that are identical to the reference characters illustrated in FIG. 1 are identical to one another.

The injection unit 200 of FIG. 2 is provided with an injection cylinder and piston (each not shown) which communicate with an adapter 202 via a constricted passageway 204. The adapter 202 has a cylindrical chamber 206 in which is confined, and relative to which is axially movable, the aforementioned multi-apertured end plate 32. In the instance of FIG. 2, the end plate 32 is provided with an upper metallic, multi-apertured plate 36 having a cylindrical or annular flange 37 which functions to seal the end plate 32 to the adapter 202 during the period when the mold cavities are filled with the elastomeric stock 30 in the adapter chamber 206.

It will be understood that various means are contemplated for enabling the end plate 32 to remain constrained in the adapter chamber 206, such as the means as fully described in the aforementioned U.S. Pat. No. 3,859,024, the subject matter of which is entirely incorporated by reference herein. For example, it is even contemplated herein that the end plate 32 simply be frictionally constrained in the adapter chamber 206.

As further illustrated in FIG. 2, the injection unit 200, and more particularly the adapter 202, is provided with venting means generally denoted by the reference character 208. The venting means 208 is provided with a pair of mutually perpendicular passageways 210 and 212, the passageway 210 terminating in an open end portion confronting the mold sprue plate 42. On the other hand, the passageway 212 communicates at one end with the passageway 210 and at its opposite end with a tubular element 214 that in turn is connected to a vacuum-inducing means (not shown) of the type, for example, denoted by reference character 68 in FIG. 1.

In operation of the embodiment of FIG. 2, the mold 22 and the injection unit 200 are moved relative to one another such that the sealing means 60 that is affixed to the adapter 202 in a manner as described with respect to the sealing means 60 illustrated in FIG. 1 engages the upper surface of the sprue plate 42 so as to define a fluid-sealed spacial network in which the adapter chamber 206 communicates with the mold cavities 46 via the sprues 48 and the apertures 34 in the end plate 32. Such a condition of the initial engagement of the sealing means 60 with the sprue plate 42 is that condition illustrated in FIG. 2. In such condition, the annular gaskets 50 interposed between the mold plates 38, 40 and 42, initially are effective to keep such mold plates spaced slightly from one another such that there is a horizontal clearance therebetween. Also, the sealing means 60 is of such an axial extent that it is effective to keep the end plate 32 spaced slightly from the sprue plate 42 such that there is likewise a slight horizontal clearance therebetween. Accordingly, the venting means 208 communicates with the space 210 (or parting line) between the sprue plate 42 and the end plate 32, as well as with the mold cavities 46 via the sprues 48 and with the interior of the adapter chamber 206 via the apertures 34 in the end plate 32. As such, the venting means 208 can be actuated to evacuate undesirable fluids such as air from this special network of intercommunicating mold cavities, mold plate parting line clearances and the adapter chamber 206.

As the undesirable fluid is evacuated from such spacial network, the mold 22 and the injection unit 200 can be further forced or pressed against one another such that the mold 22 forces the end plate 32 inwardly of the adapter chamber 206 to fully compact the elastomeric stock 30 thereabove. Such compacting of the elastomeric stock 30 results in the deformation of the sealing means 60 and the annular gaskets 50. In turn, all the mold plates abut tightly against one another so that the mold 22 can abut tightly against the end plate 32. The injection piston (not shown) is then actuable to force the elastomeric stock 30 through the apertures 34 in the end plate and into the sprues 48 of the mold to fill the mold cavities 46. The mold cavities 46, thus, may be filled with elastomeric stock without interference of any undesirable fluids that would otherwise be present in the absence of such venting means 208.

Referring now to FIG. 3, there is illustrated a varient of the embodiment of FIG. 2. The only difference between the embodiments of FIGS. 2 and 3 is that in FIG. 3 the venting means, denoted in this instance by the reference character 308, is provided in the mold 22 and not in the injection unit 200. In this regard, the venting means 308 is provided with a pair of mutually perpendicular passageways 310 and 312 formed in the base plate 38 of the mold 22, the passageway 312 communicating at one end with the clearance or parting line 52 between the base plate 38 and the cavity-defining plate 40. On the other hand, the passageway 310 communicates at one end with the passageway 312 and at its opposite end with a tubular element 314 that in turn is operatively associated with a vacuum-inducing means (not shown) of the type illustrated in FIG. 1 and denoted by reference character 68. The venting means 308, furthermore, includes a vertical passageway 316 extending entirely through the cavity-defining plate 40 and a vertical passageway 318 formed in the sprue plate 42. The passageways 316 and 318 communicate coaxially with one another and with the passageway 312. The passageway 318, furthermore, communicates with the parting line clearance 320 between the mold 22 and the adapter 202, as well as with the horizontal clearance 322 between the end plate 32 and the sprue plate 42. Thus, the venting means 308 of FIG. 3, in a manner akin to the venting means 208 of FIG. 2, communicates simultaneously with the interior of the adapter chamber 206 via the apertures 34 in the end plate 32 and with the mold cavities 46 via the sprues 48. Moreover, such venting means 308 also communicates with all parting line clearances between the various mold plates, and between the mold 22 and the adapter 202 for evacuating undesirable fluids from the entire sealed spacial network in a manner as described above for the embodiment of FIG. 2.

Figure 10:
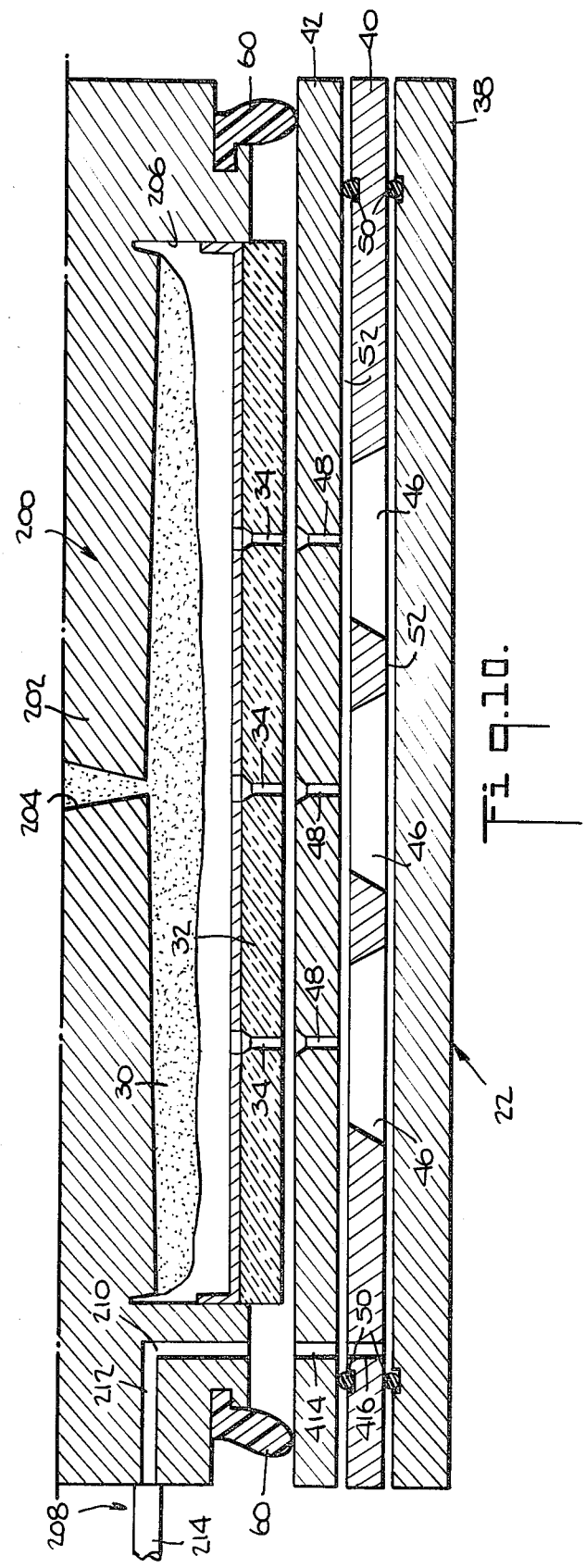
FIG. 10 is a view similar to FIG. 2 of still another varient of the embodiment of the venting means of FIG. 2.

Referring now to FIG. 10, there is illustrated a second varient of the embodiment of FIG. 2. In this regard, the venting means 208 of FIG. 2 is formed in the adapter 202 of FIG. 10 in a manner as described above for the venting means 208 of the embodiment of FIG. 2. However, the venting means 208 of FIG. 10, furthermore, includes a pair of coaxially aligned passageways 414 and 416 formed entirely through, respectively, and in, the sprue plate 42 and the cavity-defining plate 40 of the mold 22. The additional passageways 414 and 416 provided in such mold plates extend the capability of the venting means 208 to communicate with the parting line clearances 52 between the various mold plates to optimize the evacuation of undesirable fluids from such clearances likewise.

It will be understood, as in the case of the embodiments of FIGS. 2 and 3, that the evacuation of the undesirable fluids from the spacial network defined by the intercommunicating mold cavities 46 and the interior of the injection chamber 206 can be effected immediately upon the engagement of the sprue plate 42 with the sealing means 60 so as to seal such spacial network from the exterior of the system. Such fluid evacuation can continue even during the period in which the elastomeric stock 30 is initially forced into the various cavities 46. It should be clear that when the mold 22 tightly engages the injection unit 200 the end plate 32 is forced inwardly of the adapter chamber 206 and against the elastomeric stock 30, thereby, compacting the latter.

Referring now to FIG. 4, there is illustrated, on enlarged scale, a further embodiment of the venting means of the present invention. Such further embodiment may be utilized in conjunction with the type of injection unit 20 illustrated in FIG. 1 wherein the end plate 32 is fixedly secured to the injection cylinder 24 or, alternatively, in conjunction with the injection unit 200 of the type illustrated in FIG. 2 wherein the end plate 32 is movably confined at least in the adapter chamber 206.

In the instance of FIG. 4, the venting means is denoted generally by the reference character 500 and includes a first or principal passageway 502 formed in and running laterally of the end plate 32 between the thermalinsulatory portion thereof and the metal sheet 36. A second passageway 504 extending perpendicular to the first passageway 502 and communicating therewith runs axially of the end plate 32 and terminates at one end thereof in an open-ended portion 506 of increased diameter. Such portion 506 is in fact formed at the underside or bottom 32' (FIG. 5) of the end plate 32 and communicates with an elongate narrow groove 508 also formed in the underside 32' of the end plate 32. In turn, the elongate groove 508 communicates with a constricted passageway 510 having a maximum diameter no greater than 0.5 millimeters. Such passageway 510 is vertically formed in the sprue plate 42 of the mold 22 and communicates with one mold cavity 46. It will be understood that the end portion 509 of the elongate groove 508 that communicates with the passageway 510 is formed as a blind portion in the end plate 32 and, thus, does not extend entirely therethrough. For reference purposes, the angular relationship of the various passageways of the venting means 500 is generally illustrated in FIG. 5.

In operation of the embodiment of the venting means 500 of FIG. 4, the passageway 502 which is operatively associated with a vacuum-inducing means (not shown) of the type, for example, illustrated in FIG. 1 and denoted generally by the reference character 68 may be utilized to initiate a vacuum simultaneously in the mold cavities 46 and in the interior of the injection unit in which the elastomeric stock 30 is confined via the various sprues 48 and the apertures 34. As the vacuum is established, undesirable fluids such as air are evacuated from the mold cavities 46 and the injection chamber via the constricted passageway 510, the elongate groove 508, the vertical passageway 504 and the principal passageway 502.

If injection occurs simultaneously as the air is evacuated, a slight amount of elastomeric stock 30 may be pulled through the constricted passageway 510 and slightly into the elongate groove 508 at which location subsequent vulcanization of the stock in the mold cavities 46 will result in a similar vulcanization of such portion of the stock pulled into the groove 508. It will be understood, of course, that when the mold is separated from the injection unit the cured portion of the elastomeric stock pulled into the elongate groove 508 can be readily removed manually or mechanically therefrom. It will be further understood that because of the particular minute dimensions contemplated for the groove 508 and the constricted passageway 510, for example, on the order of approximately 0.5 millimeters in width, no additional elastomeric stock can flow into the vertical passageway 504 and in turn into the laterally running passageway 502.

However, in order to absolutely ensure that no elastomeric stock can be pulled into the various passageways of the venting means of any of the embodiments of the present invention, it is contemplated that any of such embodiments can be provided with a device as illustrated in FIG. 8. In this respect, as illustrated in FIG. 8, the end plate 32 may be formed with a venting passageway 600 that extends laterally and communicates with an enlarged recess 602 formed in the end face thereof that is engageable with a sprue plate 604 of a particular multicavity mold. In the recess 602, there is confined an insert 606 having an upper aperture 608 communicating with the venting means 600. The insert 606 is formed with a chamber in which is confined a porous metallic element 610. The insert chamber is coaxially aligned with a respective element 612 confined in the sprue plate 602 and having a vertical extremely narrow, non-sprue-constituting passageway 614 through which fluid may pass.

The porous metallic element 610 has the form of a cylinder and functions to allow pneumatic fluid, such as air or the like, to pass upwardly therethrough into the venting passageway 600 and out of the embodiments of the molding system of the present invention. However, it should be clear that because of the narrow dimensions of the vertical passageway or opening 614, and the presence of the porous metallic element 610, the elastomeric stock in a corresponding mold cavity cannot flow upwardly through the insert 606 and into the venting means 600. The insert 606 may, of course, have other minute openings of the size, for example, of the opening 614 to obviate the need for the element 610.

It will be further understood that because of the provision of the venting means of the present invention, in the embodiments shown in FIGS. 4, 5 and 8, and in the embodiments shown in FIGS. 3 and 10, if raised land surfaces with the appropriate surface finish surrounding each cavity are provided as described below, the evacuation of undesirable fluids can occur simultaneously as the mold cavities are filled with elastomeric stock. As a result, initially during the period just prior to the injection of elastomeric stock into such mold cavities, a partial vacuum may be produced throughout the entire spacial network of intercommunicating mold cavities and injection chamber to initiate the evacuation of undesirable fluids. Thereafter, as the available free space in the cavities and injection chamber is filled by the incoming elastomeric stock, the degree of the vacuum is increased (as a result of the diminishing free space), thereby insuring that all of the undesirable fluids are evacuated.

It is desirable to provide, on the cavity defining plates in embodiments such as those of FIGS. 3 and 10, raised lands about the cavities, the lands having surface radial grind finish markings thereon in the order of about 10 to 20 microinches in depth which, during filling of the mold cavities, will allow the passage of air from the cavities but will block the flow of elastomeric stock therefrom. These raised land surfaces allow continued communication between the venting means 308 (FIG. 3) or 208 (FIG. 10) and the cavities 46 even while the plates are pressed tightly together during filling of the cavities with elastomeric stock. U.S. Pat. No. 3,151,360, dated Oct. 6, 1964, which is hereby incorporated by reference herein in its entirety, discloses many structures for mold plates with raised ground land surfaces, and describes the preferred surface finish in detail.

Having thus defined the nature of the present invention, it will be understood that the foregoing description of the various preferred embodiments of the present invention is for purposes of illustration only and that the various structural and operational features and relationships herein disclosed are susceptible to a number of modifications and changes none of which entails any departure from the spirit and scope of the present invention as defined in the hereto appended claims.

We claim:

1. In molding apparatus including an injection unit having an open ended chamber in which elastomeric stock is disposable, piston means movably confined in said chamber for compressing said stock in and expelling said stock from said chamber, a multiapertured end plate secured to an open end of said chamber, a multicavity mold having a sprue associated with each cavity aligned with a corresponding aperture of said end plate, and means operatively associated with said injection unit and said mold for moving said injection unit and said mold relatively towards one another to engage said mold with said end plate so that each sprue communicates with the corresponding aperture at the parting line between said mold and said injection unit, the improvement comprising sealing means interposed between said injection unit and said mold for releasably pneumatically sealing said injection unit and said mold to one another when said mold and said end plate are at least in near engagement with one another, venting means in communication with said chamber and said cavity of said mold for simultaneously evacuating fluid trapped in said chamber and said mold cavities preparatory to filling said cavities with elastomeric stock from said chamber, said sealing means cooperatively with said injection unit, said mold and said venting means defining a spacial network in which said venting means communicates simultaneously with all of said cavities and said chamber of said injection unit said venting means including means for communicating the parting line between said injection unit and said mold with the remainder of said venting means, so that said venting means is in communication with said chamber through said apertures and said venting means is in communication with said cavities of said mold through said sprues, at least when said mold and said end plate are in near engagement.

2. In molding apparatus including an injection unit having an open ended chamber in which elastomeric stock is disposable, piston means movably confined in said chamber for compressing said stock in and expelling said stock from said chamber, a multiapertured end plate secured to an open end of said chamber, a multicavity mold having a sprue associated with each cavity aligned with a corresponding aperture of said end plate, and means operatively associated with said injection unit and said mold for moving said injection unit and said mold relatively towards one another to engage said mold with said end plate so that each sprue communicates with the corresponding aperture, the improvement comprising sealing means interposed between said injection unit and said mold for releasably pneumatically sealing said injection unit and said mold to one another when said mold and said end plate are at least in near engagement with one another, venting means in communication with said chamber and said cavity of said mold for simultaneously evacuating fluid trapped in said chamber and said mold cavities preparatory to filling said cavities with elastomeric stock from said chamber, said sealing means cooperatively with said injection unit, said mold and said venting means defining a spacial network in which said venting means communicates simultaneously with all of said cavities and said chamber of said injection unit, said sealing means being an annular elastomeric element, said injection unit at the open end of said chamber including means for securing said elastomeric element in surrounding relation about said end plate, said elastomeric element axially protruding beyond said end plate and being engageable with said mold before said mold engages said end plate.

3. The improvement as claimed in claim 2, wherein said annular elastomeric element of said sealing means includes a first annular portion affixed to said injection unit, and a second annular portion integral with said first annular portion, said second annular portion having a generally skirt-shaped contour and being deformable axially and radially outwardly.

4. The improvement as claimed in claim 2, wherein said mold includes a plurality of separable plate members, said plate members being abuttable against one another along parting lines, and cooperatively defining said cavities, and further including annular elastomeric gasket means interposed between adjoining ones of said plate members outwardly of said cavities for sealing said cavities from the atmosphere, said moving means serving to axially compress said gasket means between said plate members and said sealing means between said mold and said injection unit during movement of said mold and injection unit relatively toward one another.

5. In molding apparatus including an injection unit having an open ended chamber in which elastomeric stock is disposable, piston means movably confined in said chamber for compressing said stock in and expelling said stock from said chamber, a multiapertured end plate secured to an open end of said chamber, a multicavity mold having a sprue associated with each cavity aligned with a corresponding aperture of said end plate, and means operatively associated with said injection unit and said mold for moving said injection unit and said mold relatively towards one another to engage said mold with said end plate so that each sprue communicates with the corresponding aperture, the improvement comprising sealing means interposed between said injection unit and said mold for releasably pneumatically sealing said injection unit and said mold to one another when said mold and said end plate are at least in near engagement with one another, venting means in communication with said chamber and said cavity of said mold for simultaneously evacuating fluid trapped in said chamber and said mold cavities preparatory to filling said cavities with elastomeric stock from said chamber, said sealing means cooperatively with said injection unit, said mold and said venting means defining a spacial network in which said venting means communicates simultaneously with all of said cavities and said chamber of said injection unit, said venting means including a vent passageway formed in said injection unit, one end of said vent passageway communicating with the interior of said chamber and the other end of said vent passageway communicating with the remainder of said venting means, so that at least when said mold and said end plate are in near engagement with one another, said venting is in communication with said chamber by way of said vent passageway and in communication with said cavities of said mold via said chamber, said apertures and said sprues.

6. In molding apparatus including an injection unit having an open ended chamber in which elastomeric stock is disposable, piston means movably confined in said chamber for compressing said stock in and expelling said stock from said chamber, a multiapertured end plate secured to an open end of said chamber, a multicavity mold having a sprue associated with each cavity aligned with a corresponding aperture of said end plate, and means operatively associated with said injection unit and said mold for moving said injection unit and said mold relatively towards one another to engage said mold with said end plate so that each sprue communicates with the corresponding aperture, the improvement comprising sealing means interposed between said injection unit and said mold for releasably pneumatically sealing said injection unit and said mold to one another when said mold and said end plate are at least in near engagement with one another, venting means in communication with said chamber and said cavity of said mold for simultaneously evacuating fluid trapped in said chamber and said mold cavities preparatory to filling said cavities with elastomeric stock from said chamber, said sealing means cooperatively with said injection unit, said mold and said venting means defining a spacial network in which said venting means communicates simultaneously with all of said cavities and said chamber of said injection unit, said venting means including a vent passageway formed in said injection unit, one end of said vent passageway communicating with the interior of said chamber and the other end of said vent passageway communicating with the remainder of said venting means, said vent passageway including a first passageway formed in and extending axially of said end plate, said first passageway extending only partially through said end plate and having an open end communicating with said open-ended injection unit chamber, a second passageway formed in and extending laterally of said end plate and communicating with said first passageway, and a third passageway formed in said injection unit and communicating at one end with said second passageway and at an opposite end with the remainder of said venting means.

7. The improvement as claimed in claim 6, wherein said end plate is fixedly attached to said injection unit.

8. The improvement as claimed in claim 6, including blocking means overlying said open end of said first passageway and operatively associated with said end plate internally of said chamber for selectively allowing fluid but not elastomeric stock to enter said first passageway.

9. The improvement as claimed in claim 8, wherein said blocking means includes a flexible element secured at one end to said end plate and cantilevered to overlie in spaced relation said open end of said first passageway.

10. The improvement as claimed in claim 8, wherein said blocking means includes a valve axially movable in said first passageway, and resilient means for urging said valve into an open condition relative to said first passageway, said valve including a head projecting into said injection unit chamber and engageable with the periphery of said open end of said first passageway in opposition to said resilient means for closing said open end of said first passageway when pressured by elastomeric stock under expulsion from said injection unit.

11. In molding apparatus including an injection unit having an open ended chamber in which elastomeric stock is disposable, piston means movably confined in said chamber for compressing said stock in and expelling said stock from said chamber, a multiapertured end plate secured to an open end of said chamber, a multicavity mold including a plurality of separable mold plates which cooperatively define the cavities, said mold having a sprue associated with each cavity aligned with a corresponding aperture of said end plate, and means operatively associated with said injection unit and said mold for moving said injection unit and said mold relatively towards one another to engage said mold with said end plate so that each sprue communicates with the corresponding aperture at the parting line between said mold and said injection unit, the improvement comprising sealing means interposed between said injection unit and said mold for releasably pneumatically sealing said injection unit and said mold to one another when said mold and said end plate are at least in near engagement with one another, venting means in communication with said chamber and said cavity of said mold for simultaneously evacuating fluid trapped in said chamber and said mold cavities preparatory to filling said cavities with elastomeric stock from said chamber, said sealing means cooperatively with said injection unit, said mold and said venting means defining a spacial network in which said venting means communicates simultaneously with all of said cavities and said chamber of said injection unit said venting means including means for communicating the parting line between said injection unit and said mold with the remainder of said venting means, so that said venting means is in communication with said cavities of said mold through said sprues, at least when said mold and said end plate are in near engagement, said mold including annular elastomeric gasket means interposed between said mold plates outward of said cavities, the gasket means interposed between at least one pair of adjoining mold plates being spacing gasket means which extend when unpressured into the parting line space between said adjoining mold plates to space said pair of separable mold plates from one another, said spacing gasket means being compressible when pressured to allow said mold plates to tightly press against one another and seal the parting line therebetween against leakage of molding stock, said mold also including a passageway including at least one portion formed in at least one of said mold plates and communicating at a point remote from said cavities but inward of said gasket means with at least one parting line between at least one pair of said mold plates having interposed spacing means, said passageway also communicating with said venting means.

12. The improvement as claimed in claim 11, wherein said passageway in said mold communicates with the parting line between said injection unit and said mold, and said means for communicating the parting line between said injection unit and said mold with the remainder of said venting means includes said passageway in said mold.

13. The improvement as claimed in claim 11, wherein said means for communicating the parting line between said injection unit and said mold with the remainder of said venting means includes a passageway formed in said injection unit, said passageway in said injection unit having one end open to said parting line between said injection unit and said mold and the other end in communication with the remainder of said venting means, and wherein said passageway in said mold has an end open to the parting line between said injection unit and said mold, whereby said passageway in said mold will communicate with said venting means through said passageway in said injection unit.

14. The improvement as claimed in claim 11, wherein said mold includes at least three separable plates, the gasket means interposed between at least two pairs of adjoining plates are spacing gasket means, and said parting passageway communicates with at least two parting lines defined by pairs of plates having spacing gasket means.

15. The improvement as claimed in claim 11, wherein at least one plate of one pair of plates which defines a parting line with which said passageway communicates has raised land surfaces closely surrounding each cavity which engage the surface of the adjacent plate when said plates are tightly pressed together, whereby the confronting surfaces of said pair of plates in areas remote from said raised land surfaces define vent channels at the parting line between said pair of plates in communication with said passageway, and said land surfaces have a surface finish which will allow passage of gasses but not molding stock between said land surfaces and the engaged surface of the adjoining plate when said plates are tightly pressed together, whereby said cavities will remain in pneumatic communication with said vent channels and thus with said passageway and said venting means, while said mold plates are pressed together during filling of said cavities.

16. The improvement as claimed in claim 15, wherein said surface finish includes generally radially oriented grind finish markings in the order of about 10 to 20 microinches in depth.

17. In molding apparatus including an injection unit having an open ended chamber in which elastomeric stock is disposable, piston means movably confined in said chamber for compressing said stock in and expelling said stock from said chamber, a multiapertured end plate secured to an open end of said chamber, a multicavity mold having a sprue associated with each cavity aligned with a corresponding aperture of said end plate, and means operatively associated with said injection unit and said mold for moving said injection unit and said mold relatively towards one another to engage said mold with said end plate so that each sprue communicates with the corresponding aperture, the improvement comprising venting means in communication with said chamber and said cavities of said mold for simultaneously evacuating fluid entrapped in said chamber and said mold cavities preparatory to filling said cavities with elastomeric stock from said chamber and vent passageways in said mold, one of said vent passageways being associated with each cavity of said mold, the vent passageway of each cavity extending from an opening in the cavity remote from the sprue of that cavity to an opening at the parting line between said mold and said injection unit, said venting means including a passageway network formed in said end plate of said injection unit having openings to the parting line between said injection unit and said mold, one of said openings being associated with each cavity of said mold and overlying the opening of the vent passageway of the associated cavity at said parting line, whereby, when said mold engages said end plate, said venting means will be in communication with said cavities by way of said passageway network and said vent passageways, and said venting means will thereby also communicate with said chamber, by way of said sprues and said apertures of said end plate.

18. The improvement as claimed in claim 17, wherein said passageway network includes a first passageway formed in and running laterally of said end plate, a second passageway formed in and running axially of said end plate and communicating with said first passageway, a third passageway formed in and running laterally of said end plate and communicating with said second passageway, said third passageway being formed as an elongate groove in one surface of said end plate.

19. The improvement as claimed in claim 18, wherein one end of said second passageway with which communicates said elongate groove has a larger diameter than the remainder of said second passageway, each of said passageways which directly communicate in succession with one another extending in mutually perpendicular relation.

20. The improvement as claimed in claim 17, wherein said passageway network includes filter means adjacent to each of said openings thereof for allowing gasses to flow from said mold cavities into said passageway network and preventing elastomeric stock from entering said passageway network.

21. The improvement as claimed in claim 20, wherein said filter means includes a porous metal element.

22. The improvement as claimed in claim 17, wherein each of said vent passageways in said mold includes a portion having a diameter no greater than 0.5 millimeters.

* * * * *

UNITED STATES PATENT AND TRADEMARK OFFICE
CERTIFICATE OF CORRECTION

PATENT NO.   :   4,140,470
DATED        :   February 20, 1979
INVENTOR(S)  :   Lambert Pasch and Heinz Wagemann It is certified that error appears in the above-identified patent and that said Letters Patent are hereby corrected as shown below:

In Fig. 2 the numeral "210", identifying the space (or parting line) between end plate 32 and top mold plate 42, should read --211--.  Column 1, line 45, delete "it".  Column 2, line 25, the word "wate" should read --waste--.  Column 3, line 8, after "filling" and before "the", insert --of--; lines 32 and 57, the word "varient" should read --variant-- (both occurrences).  Column 7, line 4, insert a comma (,) between the words "Fig. 1" and "are"; line 58, change the numeral "210" to --211--.  Column 8, lines 16 and 53, the word "varient" should read --variant-- (both occurrences). Column 9, line 26, the word "thermalinsulatory" should read --thermal-insulatory--.  Column 11, line 47, after "unit" and before "said", insert --a comma (,)--.  Column 13, line 6, after "venting" and before "is", insert --means--.

*Signed and Sealed this*

*Eleventh* Day of *December 1979*

[SEAL]

*Attest:*

SIDNEY A. DIAMOND

*Attesting Officer*   *Commissioner of Patents and Trademarks*